(12) United States Patent
Formaro et al.

(10) Patent No.: US 6,337,373 B1
(45) Date of Patent: Jan. 8, 2002

(54) POLYOLEFIN GRAFT COPOLYMERS MADE WITH FLUORINATED MONOMERS

(75) Inventors: Leonardo Formaro, Larchmont, NY (US); Suhas G. Niyogi, Hockessin; Anthony J. DeNicola, Jr., Newark, both of DE (US)

(73) Assignee: Montell Technology Company BV (NL)

( * ) Notice: Subject to any disclaimer, the term of this patent is extended or adjusted under 35 U.S.C. 154(b) by 0 days.

(21) Appl. No.: 09/364,444

(22) Filed: Jul. 30, 1999

(51) Int. Cl.[7] .................. C08F 255/00; C08F 255/02
(52) U.S. Cl. .................. 525/193; 525/243; 525/276
(58) Field of Search .................. 525/276, 193, 525/243

(56) References Cited

U.S. PATENT DOCUMENTS

| | | | |
|---|---|---|---|
| 4,605,704 A | 8/1986 | Eastman et al. | 525/193 |
| 4,666,991 A | 5/1987 | Matsui et al. | 525/276 |
| 4,806,581 A | 2/1989 | Walker | 524/178 |
| 5,140,074 A | 8/1992 | DeNicola, Jr. | 525/263 |
| 5,314,959 A | 5/1994 | Rolando et al. | 525/276 |
| 5,336,717 A | 8/1994 | Rolando et al. | 525/64 |

*Primary Examiner*—Jeffrey Mullis

(57) ABSTRACT

A fluorine-containing graft copolymer is made from a backbone of an olefin polymer material to which is graft polymerized (a) at least one gaseous fluorinated monomer such as vinylidene fluoride, (b) at least one fluorinated acrylic acid or ester, (c) a mixture of (a) and (b), or (d) a mixture of (a) and/or (b) and a non-fluorinated monomer such as methyl methacrylate. An organic peroxide or a polymeric peroxide is used as the initiator for the graft polymerization process. The graft copolymers have improved surface properties and oxygen barrier properties, and improved thermal stability.

13 Claims, 1 Drawing Sheet

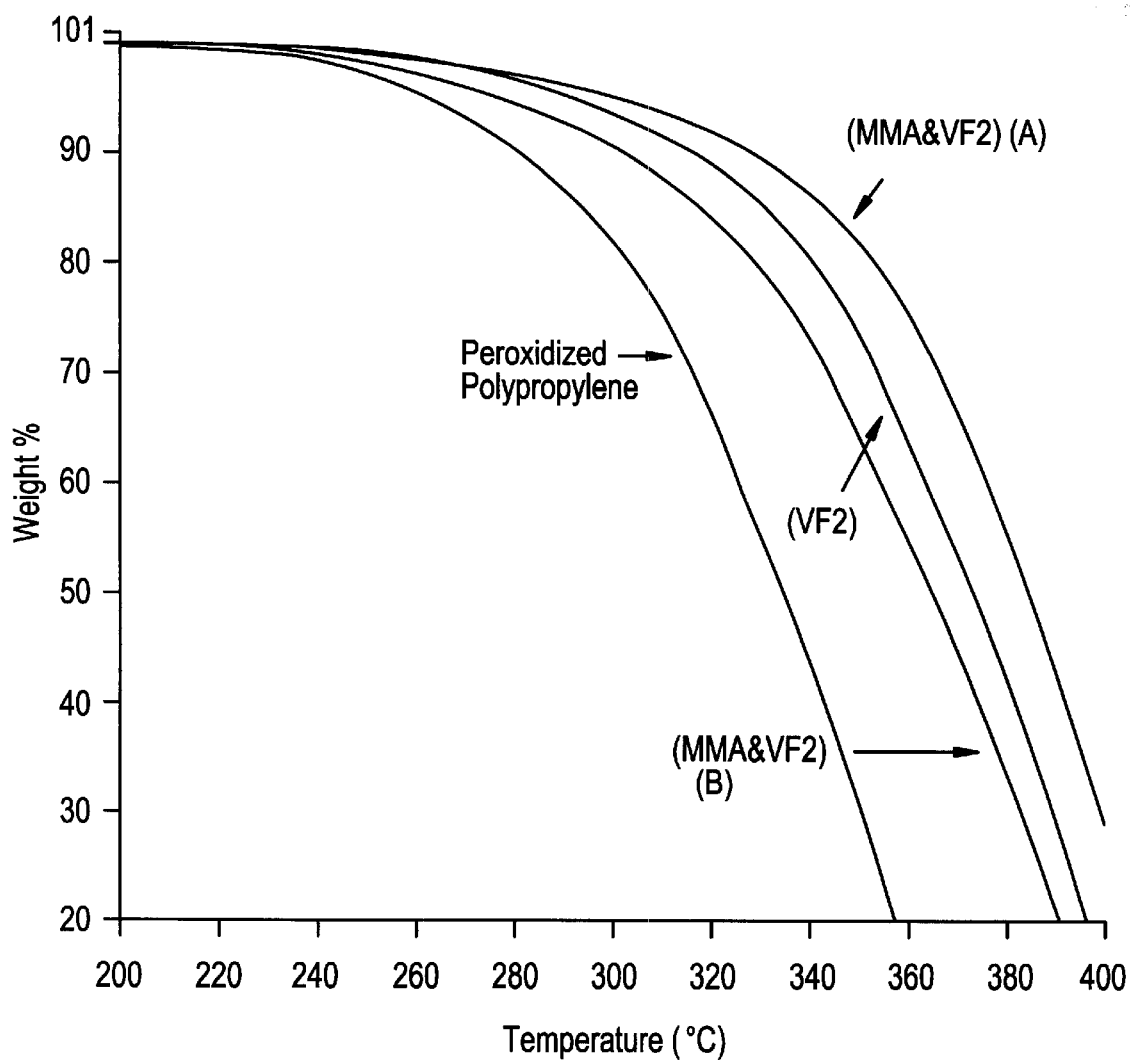

POLYOLEFIN GRAFT COPOLYMERS MADE WITH FLUORINATED MONOMERS

FIELD OF THE INVENTION

This invention relates to polyolefin graft copolymers.

BACKGROUND OF THE INVENTION

Polyolefins are relatively inexpensive and are superior in processability, toughness, water resistance, organic solvent resistance, and chemical resistance. However, they lack stability toward an oxidizing environment and are deficient in surface properties such as coefficient of friction and scratch and mar resistance, as well as in oxygen barrier properties.

Fluorinated polymers are characterized by resistance to harsh chemicals as well as stability toward heat, ultraviolet light, high energy radiation, and oxidation. Polyvinylidene fluoride, a member of the class of fluorinated polymers, is a semi-crystalline material with a high dielectric constant that can easily be processed on conventional molding and extrusion equipment. It also has high mechanical and impact strength, and high resistance to creep, fatigue and abrasion. Film made from this polymer has excellent oxygen and moisture barrier properties.

Graft copolymers of polyolefins are of interest because they are capable of possessing some properties of the polymerized grafting monomer as well as of the polyolefin backbone.

U.S. Pat. Nos. 4,806,581 and 4,605,704 disclose a process for making graft copolymers in which liquid monomer and initiator are absorbed into solid polyolefin particles, followed by reaction of the monomer in the particles to produce polymer and graft copolymer simultaneously in the same reactor. The grafting monomers include vinyl monohalides, such as vinyl chloride, and dihalides, such as vinylidene fluoride, which can be mixed with less than 50% of another monomer such as an acrylate or methacrylate ester. The resulting product can be molded to form transparent or translucent molded articles.

There is still a need for an improved process for producing graft copolymers comprising a polyolefin backbone which are useful for forming articles with improved surface and barrier properties as well as improved thermal stability.

SUMMARY OF THE INVENTION

In one embodiment of this invention, a fluorine-containing graft copolymer comprises a backbone of an olefin polymer material to which is graft polymerized (a) at least one fluorinated gaseous monomer having the formula $CR_1R_2=CR_3R_4$, where $R_1$=H, F, or Cl; $R_2$=H, F, or Cl; $R_3$=H, F, $CH_3$, $CF_3$, or Cl, and $R_4$=H, F, or Cl, wherein at least two fluorine atoms are present, and, optionally, (b) at least one non-fluorinated monomer selected from the group consisting of (i) vinyl-substituted aromatic, heterocyclic, and alicyclic compounds, (ii) unsaturated aliphatic nitrites, and (iii) unsaturated aliphatic monocarboxylic acids or esters thereof, wherein the total amount of monomers added is about 1 to about 100 parts per hundred parts of the olefin polymer material, and the particulate olefin polymer material has a weight average diameter of about 0.4–7 mm, a surface area of at least 0.1 m$^2$/g, and a pore volume fraction of at least about 0.07, and wherein more than 40% of the pores in the particle have a diameter greater than 1 micron.

This graft copolymer is prepared by a process comprising, in a non-oxidizing atmosphere:

(1) treating a particulate olefin polymer material at a temperature of about 10° to about 70° C. with about 0.1 to about 6.0 parts per hundred parts of the olefin polymer material, of an organic compound that is a chemical free radical polymerization initiator and has a decomposition half-life at the temperature used in step (2) of about 1 to about 240 minutes, (2) increasing the temperature to about 60° to about 115° C., (3) adding (a) at least one fluorinated gaseous monomer having the formula $CR_1R_2=CR_3R_4$, where $R_1$=H, F, or Cl; $R_2$=H, F, or Cl; $R_3$=H, F, $CH_3$, $CF_3$, or Cl, and $R_4$=H, F, or Cl, wherein at least two fluorine atoms are present, and, optionally, (b) at least one non-fluorinated monomer selected from the group consisting of (i) vinyl-substituted aromatic, heterocyclic, and alicyclic compounds, (ii) unsaturated aliphatic nitrites, and (iii) unsaturated aliphatic monocarboxylic acids or esters thereof, wherein the total amount of monomers added is about 1 to about 100 parts per hundred parts of the olefin polymer material, to produce and maintain a pressure of about 200 to about 900 psi (4) heating at a temperature within the range specified in step (2) for about 1 to about 6 hours, (5) cooling to room temperature, and (6) releasing the pressure to remove unreacted monomer, wherein the particulate olefin polymer material has a weight average diameter of about 0.4–7 mm, a surface area of at least 0.1 m$^2$/g, and a pore volume fraction of at least about 0.07 and wherein more than 40% of the pores in the particle have a diameter greater than 1 micron.

In another embodiment, a fluorine-containing graft copolymer is prepared in a non-oxidizing environment by:

(1) heating a peroxidized olefin polymer material to a temperature of about 600 to about 140° C., (2) adding (a) at least one fluorinated gaseous monomer having the formula $CR_1R_2=CR_3R_4$, where $R_1$=H, F, or Cl; $R_2$=H, F, or Cl; $R_3$=H, F, $CH_3$, $CF_3$, or Cl, and $R_4$=H, F, or Cl, wherein at least two fluorine atoms are present, and, optionally, (b) at least one non-fluorinated monomer selected from the group consisting of (i) vinyl-substituted aromatic, heterocyclic, and alicyclic compounds, (ii) unsaturated aliphatic nitrites, and (iii) unsaturated aliphatic monocarboxylic acids or esters thereof, wherein the total amount of monomers added is about 1 to about 100 parts per hundred parts of the olefin polymer material, to produce and maintain a pressure of about 200 to about 900 psi (3) heating at a temperature within the range specified in step (1) for about 1 to about 6 hours, (4) cooling to room temperature, and (5) releasing the pressure to remove unreacted monomer.

Another embodiment of this invention comprises a fluorine-containing graft copolymer comprising an olefin polymer backbone to which is graft polymerized about 1 to about 120 parts per hundred parts of the olefin polymer material, of (a) at least one fluorinated monomer having the formula $CH_2=C(R_1)-(COOR_2)$, where $R_1$=H, $CH_3$, or $CF_3$, and $R_2$ is H or a partially or completely fluorinated $C_1-C_{12}$ alkyl group, and, optionally, (b) at least one non-fluorinated monomer selected from the group consisting of (i) vinyl-substituted aromatic, heterocyclic, and alicyclic compounds, (ii) unsaturated aliphatic nitrites, and (iii) unsaturated aliphatic monocarboxylic acids or esters thereof.

This graft copolymer is prepared by a process comprising, in a non-oxidizing atmosphere:

(1) treating a particulate olefin polymer material at a temperature of about 60° C. to about 125° C. with about 0.1 to about 6.0 parts per hundred parts of the olefin polymer material, of an organic compound that is a chemical free radical polymerization initiator and has a decomposition half-life at the temperature used of about 1 to about 240 minutes;

(2) treating the olefin polymer material at the temperature selected over a time period that coincides with or following (1), with or without overlap, with (a) at least one fluorine-containing monomer having the formula $CH_2=C(R_1)-(COOR_2)$, where $R_1=H$, $CH_3$, or $CF_3$, and $R_2$ is H or a partially or completely fluorinated $C_1-C_{12}$ alkyl group, and, optionally, (b) at least one non-fluorinated monomer selected from the group consisting of (i) vinyl-substituted aromatic, heterocyclic, and alicyclic compounds, (ii) unsaturated aliphatic nitrites, and (iii) unsaturated aliphatic monocarboxylic acids or esters thereof, wherein the total amount of monomers added is about 1 to about 120 parts per hundred parts of the olefin polymer material, the monomer being added to the olefin polymer material over a time period from 5 minutes to 3–4 hours to provide a rate of addition that is less than about 4.5 pph per minute at any addition level; and thereafter (3) simultaneously or successively, in any order, removing any unreacted monomer from the resulting grafted particulate olefin polymer material, and decomposing any unreacted initiator and deactivating any residual free radicals in the material.

Another embodiment of the invention is a fluorine-containing graft copolymer comprising a backbone of an olefin polymer material to which is graft polymerized a combination of:

(a) at least one fluorinated gaseous monomer having the formula $CR_1R_2=CR_3R_4$, where $R_1=H$, F, or Cl; $R_2=H$, F, or Cl; $R_3=H$, F, $CH_3$, $CF_3$, or Cl, and $R_4=H$, F, or Cl, wherein at least two fluorine atoms are present, (b) at least one fluorinated monomer having the formula $CH_2=C(R_1)-(COOR_2)$, where $R_1=H$, $CH_3$, or $CF_3$, and $R_2$ is H or a partially or completely fluorinated $C_1-C_{12}$ alkyl group, and, optionally, (c) at least one non-fluorinated monomer selected from the group consisting of (i) vinyl-substituted aromatic, heterocyclic, and alicyclic compounds, (ii) unsaturated aliphatic nitrites, and (iii) unsaturated aliphatic monocarboxylic acids or esters thereof, wherein the total amount of polymerized monomers is about 1 to about 100 parts per hundred parts of the olefin polymer material.

This graft copolymer is prepared in a non-oxidizing environment by:

(1) treating a particulate olefin polymer material at a temperature of about 10° to about 70° C. with about 0.1 to about 6.0 parts per hundred parts of the propylene polymer material, of an organic compound that is a chemical free radical polymerization initiator and has a decomposition half-life at the temperature used in step (2) of about 1 to about 240 minutes, (2) increasing the temperature to about 60° to about 115° C., (3) adding a combination of:

(a) at least one fluorinated gaseous monomer having the formula $R_1R_2=CR_3R_4$, where $R_1=H$, F, or Cl; $R_2=H$, F, or Cl; $R_3=H$, F, $CH_3$, $CF_3$, or Cl, and $R_4=H$, F, or Cl, wherein at least two fluorine atoms are present, to produce and maintain a pressure of about 200 to about 900 psi, (b) at least one fluorinated monomer having the formula $CH_2=C(R_1)-(COOR_2)$, where $R_1=H$, $CH_3$, or $CF_3$, and $R_2$ is H or a partially or completely fluorinated $C_1-C_{12}$ alkyl group, and, optionally, (c) at least one non-fluorinated monomer selected from the group consisting of (i) vinyl-substituted aromatic, heterocyclic, and alicyclic compounds, (ii) unsaturated aliphatic nitrites, and (iii) unsaturated aliphatic monocarboxylic acids or esters thereof, wherein the total amount of monomers added is about 1 to about 100 parts per hundred parts of the olefin polymer material, (4) heating at a temperature within the range specified in step (2) for about 1 to about 6 hours, (5) cooling to room temperature, and (6) releasing the pressure to remove unreacted monomer.

The graft polymerized fluorine-containing monomers are found at the surface of articles made from the graft copolymers of this invention as well as in the inside of the article, thereby reducing the coefficient of friction and improving scratch and mar resistance and oxygen barrier properties. The thermal oxidative stability of the polymer is also improved by the presence of the polymerized fluorinated monomers.

BRIEF DESCRIPTION OF THE DRAWING

FIG. 1 is a plot of temperature (°C.) against the % of the original weight of the polymer and shows the weight loss during thermogravimetric analysis in air and therefore the thermal oxidative stability of the polymers. The grafted polymers comprise a backbone of propylene homopolymer, to which was grafted poly(vinylidene fluoride) or poly (vinylidene fluoride/methyl methacrylate).

DETAILED DESCRIPTION OF THE INVENTION

In a first embodiment, the fluorine-containing graft copolymer of this invention comprises a backbone of an olefin polymer material, to which is graft polymerized (a) at least one fluorinated gaseous monomer having the formula $CR_1R_2=CR_3R_4$, where $R_1=H$, F, or Cl; $R_2=H$, F, or Cl; $R_3=H$, F, $CH_3$, $CF_3$, or Cl, and $R_4=H$, F, or Cl, wherein at least two fluorine atoms are present, and, optionally, (b) at least one non-fluorinated monomer selected from the group consisting of (i) vinyl-substituted aromatic, heterocyclic, and alicyclic compounds, (ii) unsaturated aliphatic nitriles, and (iii) unsaturated aliphatic monocarboxylic acids or esters thereof. The polymerizable monomers are present in a total amount of about 1 to about 100 parts per hundred parts of the olefin polymer material preferably about 5 to about 50 parts.

A gaseous monomer is one which is a gas at a temperature above 0°C. at atmospheric pressure.

When the grafting monomer is a gaseous monomer, either alone or in combination with a non-fluorinated monomer, the olefin polymer material that is used as the backbone of the graft copolymer is selected from the group consisting of:

(1) a homopolymer of a linear or branched $C_{2-8}$ alpha-olefin;

(2) a random copolymer of a linear or branched $C_{2-8}$ alpha-olefin with a different olefin selected from the group consisting of $C_{2-10}$ alpha-olefins, provided that, when the different olefin is ethylene, the maximum polymerized ethylene content is about 10% by weight; when the olefin is propylene and the different olefin is a $C_{4-10}$ alpha-olefin, the maximum polymerized content thereof is 20% by weight; and when the olefin is ethylene and the different olefin is a $C_{3-10}$ alpha-olefin, the maximum polymerized content thereof is 10% by weight;

(3) a random terpolymer of a linear or branched $C_{3-8}$ alpha-olefin and two different olefins selected from the group consisting of ethylene and $C_{4-8}$ alpha-olefins, provided that the maximum polymerized content of the different $C_{4-8}$ alpha-olefins is 20% by weight, and when ethylene is one of the different olefins, the maximum polymerized ethylene content is 5% by weight, and (4) linear low density polyethylene comprising a copolymer of ethylene and about 0.5% to about 35%, preferably about 1% to about 20%, and most preferably about 2% to about 15%, of at least one $C_3$–$C_{12}$ alpha-olefin, preferably a $C_4$–$C_8$ alpha-olefin, and most preferably 1-octene, having a density of about 0.88 g/cm$^3$ to about 0.935 g/cm$^3$, preferably about 0.90 g/cm$^3$ to about 0.925 g/cm$^3$.

The olefin polymer material used as the backbone of the graft copolymer is in particulate form and has a weight average diameter of about 0.4–7 mm, a surface area of at least 0.1 m$^2$/g, and a pore volume fraction of at least about 0.07, i.e., seven percent of the volume is pores, and wherein more than 40% of the pores in the particle have a diameter greater than 1 micron. Preferably more than 50% of the pores in the particle have a diameter greater than 1 micron, and most preferably more than 90% of the pores in the particle have a diameter greater than 1 micron. The pore volume fraction is preferably at least 0.12, most preferably at least 0.20.

Examples of suitable gaseous monomers include vinylidene fluoride, hexafluoropropylene, tetrafluoroethylene, 1-chloro-1-fluoroethylene, and chlorotrifluoroethylene.

The non-fluorinated monomers that can be present in addition to the fluorinated gaseous monomer include any monomeric vinyl compound capable of being polymerized by free radicals, wherein the vinyl radical H$_2$C=CR—, in which R=H or methyl, is attached to a straight or branched aliphatic chain or to a substituted or unsubstituted aromatic, heterocyclic, or alicyclic ring in a mono- or polycyclic compound. Typical substituent groups can be alkyl, hydroxyalkyl, aryl, and halo. Usually the vinyl monomer will be a member of one of the following classes: (1) vinyl-substituted aromatic, heterocyclic, or alicyclic compounds, including styrene, vinylnaphthalene, vinylpyridine, vinylpyrrolidone, vinylcarbazole, and homologs thereof, e.g., alpha- and paramethylstyrene, methylchlorostyrene, p-tert-butylstyrene, methylvinylpyridine, and ethylvinylpyridine, and (2) unsaturated aliphatic nitriles and carboxylic acids and their esters including acrylonitrile; methacrylonitrile; acrylic acid; acrylate esters such as the methyl ethyl, hydroxyethyl, 2-ethylhexyl, and butyl acrylate esters; methacrylic acid; ethacrylic acid; methacrylate esters, such as the methyl, ethyl, butyl, benzyl, phenylethyl, phenoxyethyl, epoxypropyl, and hydroxpropyl methacrylate esters. Multiple monomers from the same or different classes can be employed. The preferred non-fluorinated monomers are styrenic and acrylic monomers.

The process for making the graft copolymers of this invention using at least one gaseous fluorinated monomer, or a combination of a gaseous fluorinated monomer and at least one non-fluorinated monomer comprises, in a non-oxidizing environment, (1) treating a particulate olefin polymer material at a temperature of about 10° to 70° C. with about 0.1 to about 6.0 parts per hundred parts of the olefin polymer material, of an organic compound that is a chemical free radical polymerization initiator and has a decomposition half-life at the temperature used in step (2) of about 1 to about 240 minutes;

(2) increasing the temperature to about 60° to about 115° C., (3) adding (a) at least one fluorinated gaseous monomer having the formula $CR_1R_2$=$CR_3R_4$, where $R_1$=H, F, or Cl; $R_2$=H, F, or Cl; $R_3$=H, F, CH$_3$, CF$_3$, or Cl, and $R_4$=H, F, or Cl, wherein at least two fluorine atoms are present, and, optionally, (b) at least one non-fluorinated monomer selected from the group consisting of (i) vinyl-substituted aromatic, heterocyclic, and alicyclic compounds, (ii) unsaturated aliphatic nitriles, and (iii) unsaturated aliphatic monocarboxylic acids or esters thereof, wherein the total amount of monomer added is about 1 to about 100 parts, preferably about 5 to about 50 parts, per hundred parts of the olefin polymer material, to produce and maintain a pressure of about 200 to about 900 psi, preferably about 250 to about 400 psi, (4) heating at a temperature withing the range specified in step (2) for about 1 to about 6 hours, (5) cooling to room temperature, and (6) releasing the pressure to remove unreacted monomer, wherein the particulate olefin polymer material has a weight average diameter of about 0.4–7 mm, a surface area of at least 0.1 m$^2$/g, and a pore volume fraction of at least about 0.07, and wherein more than 40% of the pores in the particle, preferably more than 50%, and most preferably more than 90%, have a diameter greater than 1 micron.

According to the method of the invention, free radical or active sites are produced in the particulate olefin polymer material by treating the polymer material with an organic compound that is a free-radical generating polymerization initiator and has a decomposition half-life at the temperature employed of about 1 to about 240, preferably about 5 to about 100, and most preferably about 10 to about 40, minutes. Organic peroxides, and especially those that generate alkoxy radicals, constitute the preferred class of initiators. These include acyl peroxides, such as benzoyl and dibenzoyl peroxides; dialkyl and aralkyl peroxides, such as di-tert- butyl peroxide, dicumyl peroxide, cumyl butyl peroxide, 1,1-di-tert-butylperoxy-3,5,5-trimethylcyclohexane, 2,5-dimethyl-2,5-di-tert-butylperoxyhexane, and bis(alpha-tert-butyl peroxyisopropylbenzene); peroxy esters, such as tert-butylperoxypivalate, tert-butyl perbenzoate, tert-butyl peroctoate; 2,5-dimethylhexyl 2,5-di(perbenzoate), tert-butyl di(perphthalate), tert-butylperoxy-2-ethyl hexanoate; and 1,1-dimethyl-3-hydroxybutylperoxy-2-ethyl hexanoate; and peroxy carbonates, such as di(2-ethylhexyl) peroxy dicarbonate, di(n-propyl)peroxy dicarbonate, and di(4-tert-butylcyclohexyl)peroxy dicarbonate. Polymeric peroxides such as peroxidized propylene homopolymers, copolymers, and terpolymers can also be used as the initiator. Peroxy esters, peroxy carbonates, and polymeric peroxides are preferred. Peroxy carbonates are most preferred. Use of a polymeric peroxide as an initiator will be described in more detail below.

"Non-oxidizing environment" is the environment or atmosphere to which the olefin polymer material is exposed during the preparation of the graft copolymer and means an environment in which the active oxygen concentration, i.e., the concentration of oxygen in a form that will react with the free radicals in the polymer material, is less than 15%, preferably less than 5%, and most preferably less than 1% by volume. The most preferred concentration of active oxygen is 0.004% or lower by volume. Within these limits, the non-oxidizing atmosphere can be any gas, or mixture of gases, that is oxidatively inert toward the free radicals in the olefin polymer material, e.g., nitrogen, argon, helium, and carbon dioxide.

A fluorinated solvent such as 2,2-dichloro-1,1,1-trifluoroethane, methyl nonafluorobutyl ether, or methyl nonafluoroisobutyl ether is preferably used when the fluorinated monomer is a gas, or a mixture of a fluorinated gaseous monomer and a liquid monomer. The fluorinated solvent solubilizes the monomer so that more polymerized monomer is incorporated into the graft copolymer.

In another embodiment, the fluorine-containing graft copolymer of this invention comprises an olefin polymer backbone to which is graft polymerized (a) at least one fluorinated acrylic or methacrylic monomer having the formula $CH_2=C(R_1)—(COOR_2)$ where $R_1$=H, $CH_3$, or $CF_3$, and $R_2$ is H or a partially or completely fluorinated $C_{1-12}$ alkyl group, and, optionally, (b) at least one non-fluorinated monomer selected from the group consisting of (i) vinyl-substituted aromatic, heterocyclic, and alicyclic compounds, (ii) unsaturated aliphatic nitriles, and (iii) unsaturated aliphatic monocarboxylic acids or esters thereof.

The fluorinated acrylic and methacrylic monomers are liquids at a temperature above 0° C. at atmospheric pressure. The monomers are present in a total amount of about 1 to about 120 parts, preferably about 2 to about 60 parts, and most preferably about 5 to about 40 parts per hundred parts of the olefin polymer material.

Examples of suitable fluorinated acrylic and methacrylic monomers include 2,2,3,4,4,4-hexafluorobutyl methacrylate; 2,2,3,3,4,4,4-heptafluorobutyl acrylate; 2,2,3,3,4,4-hexafluorobutyl acrylate; 2,2,2-trifluoroethyl acrylate; 2,2,3,3,4,4,5,5,5-nonafluoropentyl acrylate; 3,3,4,4,5,5,6,6,6-nonafluorohexyl methacrylate; 2,2,3,3,3-pentafluoropropyl acrylate; 2,2,3,3,4,4,5,5,6,6-undecafluorohexyl acrylate; 1,1,1,2,2,2-hexafluororprop-2-yl acrylate; 3,3,4,4,5,5,6,6,7,7,8,8,9,9,10,10,10-heptadecafluorodecyl acrylate, 2-(trifluoromethyl) acrylic acid; 2,2,3,3-tetrafluoropropyl acrylate; 2,2,3,3-tetrafluoropropyl methacrylate; 1,1,1,3,3,3-hexafluoroisopropyl methacrylate, and 2,2,3,3,4,4,5,5-octafluoropentyl methacrylate.

When the grafting monomer is a fluorinated acrylic or methacrylic monomer described above, or a mixture of a fluorinated gaseous monomer and a fluorinated acrylic or methacrylic monomer, with or without a non-fluorinated monomer, the olefin polymer material that is used as the backbone of the graft copolymer can be:

(1) a homopolymer of propylene having an isotactic index greater than 80, preferably about 85 to about 99;

(2) a copolymer of propylene and an olefin selected from the group consisting of ethylene and 4–10 C alpha-olefins, provided that when the olefin is ethylene, the maximum polymerized ethylene content is 10%, preferably about 4%, and when the olefin is a 4–10 C alpha-olefin, the maximum polymerized content thereof is 20% by weight, preferably about 16%, the copolymer having an isotactic index greater than 85;

(3) a terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;

(4) an olefin polymer composition comprising:
  (a) about 10% to about 60% by weight, preferably about 15% to about 55%, of a propylene homopolymer having an isotactic index greater than 80, preferably about 85 to about 98, or a copolymer of monomers selected from the group consisting of (i) propylene and ethylene, (ii) propylene, ethylene and a 4–8 C alpha-olefin, and (iii) propylene and a 4–8 C alpha-olefin, the copolymer having a polymerized propylene content of more than 85% by weight, preferably about 90% to about 99%, and an isotactic index greater than 85;
  (b) about 5% to about 25% by weight, preferably about 5% to about 20%, of a copolymer of ethylene and propylene or a 4–8 C alpha-olefin that is insoluble in xylene at ambient temperature; and
  (c) about 30% to about 70% by weight, preferably about 40% to about 65%, of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight, preferably about 10% to about 60%, most preferably about 12% to about 55%, of polymerized ethylene and being soluble in xylene at ambient temperature and having an intrinsic viscosity, measured in decahydronaphthalene at 135° C., of about 1.5 to about 4.0 dl/g,
  wherein the total amount of (b) and (c), based on the total olefin polymer composition, is about 50% to about 90%, the weight ratio of (b)/(c) is less than 0.4, preferably 0.1 to 0.3, and the composition is prepared by polymerization in at least two stages and has a flexural modulus of less than 150 MPa; or (5) a thermoplastic olefin comprising:
  (a) about 10% to about 60%, preferably about 20% to about 50%, of a propylene homopolymer having an isotactic index greater than 80, or a copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;
  (b) about 20% to about 60%, preferably about 30% to about 50%, of an amorphous copolymer from monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and
  (c) about 3% to about 40%, preferably about 10% to about 20%, of a copolymer of ethylene and propylene or a 4–8 C alpha-olefin that is insoluble in xylene at ambient temperature,
  wherein the thermoplastic olefin has a flexural modulus of greater than 150 but less than 1200 MPa, preferably about 200 to about 1100 MPa, and most preferably about 200 to about 1000 MPa.

Room or ambient temperature is ~25° C.

The 4–8 C alpha-olefins useful in the preparation of (4) and (5) include, for example, butene-1, pentene-1; hexene-1; 4-methyl-1-pentene, and octene-1.

The diene, when present, is typically a butadiene; 1,4-hexadiene; 1,5-hexadiene, or ethylidenenorbornene.

Propylene polymer materials (4) and (5) can be prepared by polymerization in at least two stages, where in the first stage the propylene; propylene and ethylene; propylene and an alpha-olefin, or propylene, ethylene and an alpha-olefin are polymerized to form component (a) of (4) or (5), and in the following stages the mixtures of ethylene and propylene; ethylene and the alpha-olefin, or ethylene, propylene and the alpha-olefin, and optionally a diene, are polymerized in the presence of (a) to form components (b) and (c) of (4) or (5).

The polymerization can be conducted in liquid phase, gas phase, or liquid-gas phase using separate reactors, all of which can be done either by batch or continuously. For example, it is possible to carry out the polymerization of component (a) using liquid propylene as a diluent, and the polymerization of components (b) and (c) in gas phase, without intermediate stages except for the partial degassing of the propylene. All gas phase is the preferred method.

The preparation of propylene polymer material (4) is described in more detail in U.S. Pat. Nos. 5,212,246 and 5,409,992, which are incorporated herein by reference. The preparation of propylene polymer material (5) is described in more detail in U.S. Pat. Nos. 5,302,454 and 5,409,992, which are incorporated herein by reference.

Propylene homopolymer is the preferred propylene polymer backbone material. A porous olefin polymer material such as those described above can also be used for the backbone polymer.

The process for making the graft copolymers of this invention using at least one fluorinated acrylic or methacrylic monomer, with or without a non-fluorinated monomer, comprises, in a non-oxidizing environment:

(1) treating a particulate olefin polymer material at a temperature of about 60° C. to about 125° C., preferably about 80°–120° C., with about 0.1 to about 6.0 parts per hundred parts of the olefin polymer material, of an organic compound that is a chemical free radical polymerization initiator and has a decomposition half-life at the temperature used of about 1 to about 240 minutes;

(2) treating the olefin polymer material at the temperature selected over a time period that coincides with or follows (1), with or without overlap, with (a) at least one fluorinated monomer having the formula $CH_2=C(R_1)-(COOR_2)$, where $R_1=H$, $CF_3$, or $CH_3$ and $R_2$ is H or a partially or completely fluorinated $C_1-C_{12}$ alkyl group, and, optionally, (b) at least one non-fluorinated monomer selected from the group consisting of (i) vinyl-substituted aromatic, heterocyclic, and alicyclic compounds, (ii) unsaturated aliphatic nitrites, and (iii) unsaturated aliphatic monocarboxylic acids or esters thereof, wherein the total amount of monomer added is about 1 to about 120 parts, preferably about 2 to about 60 parts, and most preferably about 5 to about 40 parts, per hundred parts of the olefin polymer material, the monomer being added to said olefin polymer material over a time period from 5 minutes to 3–4 hours to provide a rate of addition that is less than about 4.5 pph per minute at any addition level; and thereafter (3) simultaneouly or successively, in any order, removing any unreacted grafting monomer from the resulting grafted particulate olefin polymer material, and decomposing any unreacted initiator and deactivating any residual free radicals in said material.

Preparation of graft copolymers by contacting an olefin polymer material with a free radical polymerization initiator such as an organic peroxide, and a vinyl monomer is described in more detail in U.S. Pat. No. 5,104,074, which is incorporated herein by reference.

A peroxidized propylene polymer material can also be used for making the fluorine-containing graft copolymers of this invention. The starting material for making the peroxidized polymer can be:

(1) a homopolymer of propylene having an isotactic index greater than 80, preferably about 85 to about 99;

(2) a copolymer of propylene and an olefin selected from the group consisting of ethylene and 4–10 C alpha-olefins, provided that when the olefin is ethylene, the maximum polymerized ethylene content is 10%, preferably about 4%, and when the olefin is a 4–10 C alpha-olefin, the maximum polymerized content thereof is 20% by weight, preferably about 16%, the copolymer having an isotactic index greater than 85;

(3) a terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;

A porous propylene homopolymer, copolymer, or terpolymer such as those described above can also be used as the backbone polymer.

The starting polymer is irradiated under an electron beam at a dose rate of 0.2–10 Mrad in an inert atmosphere. The irradiated polymer is then treated with oxygen at a concentration of greater than 0.004% but less than 15% by volume, preferably less than 8%, and most preferably less than 3%, at a temperature of about 40° to about 110° C., preferably about 80° C., and then at a temperature of at least 110° C. up to the softening point of the polymer (140° C. for a propylene homopolymer). The total reaction time is typically up to three hours. After the oxygen treatment, the polymer is treated at 140° C. for one hour in an inert atmosphere such as nitrogen to quench any active free radicals.

The process for making the graft copolymers of this invention using a peroxidized olefin polymer material comprises, in a non-oxidizing environment:

(1) heating a peroxidized olefin polymer material to a temperature of about 60° to about 140° C., (2) adding (a) at least one fluorinated gaseous monomer having the formula $CR_1R_2=CR_3R_4$, where $R_1=H$, F, or Cl; $R_2=H$, F, or Cl; $R_3=H$, F, $CH_3$, $CF_3$, or Cl, and $R_4=H$, F, or Cl, wherein at least two fluorine atoms are present, and, optionally, (b) at least one non-fluorinated monomer selected from the group consisting of (i) vinyl-substituted aromatic, heterocyclic, and alicyclic compounds, (ii) unsaturated aliphatic nitrites, and (iii) unsaturated aliphatic monocarboxylic acids or esters thereof, wherein the total amount of monomer added is about 1 to about 100 parts, preferably about 5 to about 50 parts, per hundred parts of the olefin polymer material, to produce and maintain a pressure of about 200 to about 900 psi, preferably about 250 to about 400 psi, (3) heating at a temperature within the range specified in step (1) for about 1 to about 6 hours, (4) cooling to room temperature, and (5) releasing the pressure to remove unreacted monomer.

The peroxidized olefin polymer material can also be used in the preparation of the graft copolymers of this invention when at least one fluorinated monomer having the formula $CH_2=C(R_1)$—$(COOR_2)$, where $R_1$=H, $CH_3$, or $CF_3$, and $R_2$ is H or a partially or completely fluorinated $C_1$–$C_{12}$ alkyl group, or a mixture of this monomer and at least one fluorinated gaseous monomer, with or without a non-fluorinated monomer, is used as the grafting monomer.

In another embodiment, the fluorine-containing graft copolymer of this invention comprises a backbone of an olefin polymer material, to which is graft polymerized a combination of:

(a) at least one fluorinated gaseous monomer having the formula $CR_1R_2=CR_3R_4$, where $R_1$=H, F, or Cl; $R_2$=H, F, or Cl; $R_3$=H, F, $CH_3$, $CF_3$, or Cl, and $R_4$=H, F, or Cl, wherein at least two fluorine atoms are present, (b) at least one, fluorinated monomer having the formula $CH_2=C(R_1)$—$(COOR_2)$, where $R_1$=H, $CH_3$, or $CF_3$, and $R_2$ is H or a partially or completely fluorinated $C_1$–$C_{12}$ alkyl group, and, optionally, (c) at least one non-fluorinated monomer selected from the group consisting of (i) vinyl-substituted aromatic, heterocyclic, and alicyclic compounds, (ii) unsaturated aliphatic nitriles, and (iii) unsaturated aliphatic monocarboxylic acids or esters thereof.

The polymerized monomers are present in a total amount of about 1 to about 100 parts, preferably about 5 to about 50 parts, per hundred parts of the olefin polymer material.

The olefin polymer material used as the backbone of these graft copolymers can be any one of the materials described in connection with the graft copolymers made with the fluorinated acrylic or methacrylic monomers. A porous olefin polymer material such as those described above can also be used as the backbone polymer.

The process for making this graft copolymer comprises, in a non-oxidizing environment:

(1) treating a particulate olefin polymer material at a temperature of about 10° to about 70° C. with about 0.1 to about 6.0 parts per hundred parts of the olefin polymer material, of an organic compound that is a chemical free radical polymerization initiator and has a decomposition half-life at the temperature used in step (2) of about 1 to about 240 minutes, (2) increasing the temperature to about 60° to about 115° C., (3) adding a combination of:
  (a) at least one fluorinated gaseous monomer having the formula $R_1R_2=CR_3R_4$, where $R_1$=H, F, or Cl; $R_2$=H, F, or Cl; $R_3$=H, F, $CH_3$, $CF_3$, or Cl, and $R_4$=H, F, or Cl, wherein at least two fluorine atoms are present, to produce and maintain a pressure of about 200 to about 900 psi, preferably about 250 to about 400 psi,
  (b) at least one fluorinated monomer having the formula $CH_2=C(R_1)$—$(COOR_2)$, where $R_1$=H, $CH_3$, or $CF_3$, and $R_2$ is H or a partially or completely fluorinated $C_1$–$C_{12}$ alkyl group, and, optionally,
  (c) at least one non-fluorinated monomer selected from the group consisting of (i) vinyl-substituted aromatic, heterocyclic, and alicyclic compounds, (ii) unsaturated aliphatic nitriles, and (iii) unsaturated aliphatic monocarboxylic acids or esters thereof, wherein the total amount of monomers added is about 1 to about 100 parts, preferably about 5 to about 50 parts, per hundred parts of the olefin polymer material, (4) heating at a temperature within the range specified in step (2) for about 1 hour to about 6 hours, (5) cooling to room temperature, and (6) releasing the pressure to remove unreacted monomer.

In this process, the free radical polymerization initiator is added first, and then either (a) the fluorinated acrylic or methacrylic monomer and the fluorinated gaseous monomer are sequentially polymerized according to the processes described above, in any order, or (b) the fluorinated acrylic or methacrylic monomer and the fluorinated gaseous monomer are simultaneously polymerized according to the process described above for gaseous monomers. The pressure in the reactor is then released, and the reactor is purged with an inert gas such as nitrogen to remove unreacted monomer.

When the sequential polymerization process is used, if the polymerization time of the first monomer exceeds 10–15 times the half-life of the initiator, a second portion of the initiator is added before adding the second monomer. If a gaseous monomer is polymerized first, the pressure in the reactor is released prior to adding the second monomer.

Other additives such as pigments, nucleating agents, pigment dispersing aids, slip agents, and fillers such as talc, calcium carbonate, and wollastonite can also be present in the composition.

The graft copolymers of this invention can be formed into useful articles such as film and molded articles having improved surface properties and oxygen barrier properties as well as improved thermal stability. The forming can be carried out by methods known in the art including, for example, thermoforming, injection molding, sheet extrusion, profile extrusion, and blow molding.

Isotactic index is defined as the per cent of olefin polymer insoluble in xylene. The weight percent of olefin polymer soluble in xylene at room temperature is determined by dissolving 2.5 g of the polymer in 250 ml of xylene at room temperature in a vessel equipped with a stirrer, that is heated at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

Intrinsic viscosity is measured in decahydronaphthalene at 135° C.

Melt flow rate is measured according to ASTM D 1238 at 230° C. and 2.16 kg.

The pore volume fraction values were determined by a mercury porosimetry technique in which the volume of mercury absorbed by the particles is measured. The volume of mercury absorbed corresponds to the volume of the pores. This method is described in Winslow, N. M. and Shapiro, J. J., "An Instrument for the Measurement of Pore-Size Distribution by Mercury Penetration," ASTM Bull., TP 49, 39–44 (February 1959), and Rootare, H. M., "A Review of Mercury Porosimetry," 225–252 (In Hirshhom, J. S. and Roll, K. H., Eds., *Advanced Experimental Techniques in Powder Metallurgy*, Plenum Press, New York, 1970).

The surface area measurements were made by the B.E.T. method as described in JACS 60, 309 (1938).

In this specification, all parts and percentages are by weight unless otherwise noted.

EXAMPLE 1

This example describes the preparation of a fluorinated graft copolymer using a gaseous fluorinated monomer and a fluorinated solvent.

Polypropylene (500 g) having a melt flow rate (MFR) of 9 dg/min, a pore volume fraction of 0.28, a surface area of 0.3 m$^2$/g, and greater than 40% of the pores with a diameter greater than one micron, commercially available from Montell USA Inc., was charged into a 1 gallon high pressure stainless steel reactor. The reactor was fitted with nitrogen inlets and outlets, a vacuum outlet, two addition ports, and a helical impeller driven by compressed air. The reactor was equipped with a jacket through which hot or cold oil could be circulated. An inert atmosphere was established by repeated evacuation and purging with nitrogen. The bulk temperature was maintained at 23° C. After the final evacuation, a suspension of di-(4-tert-butylcyclohexyl) peroxy dicarbonate (10 g) in 100 g of deionized water was added to the polypropylene under an inert atmosphere. 2,2-Dichloro-1,1,1-trifluoroethane (200 ml) was introduced into the reactor after stirring for 10 minutes. The reactor was pressurized with vinylidene fluoride at 420 psi. Hot oil was circulated through the reactor jacket to raise the bulk temperature to 73° C. and to maintain this temperature. The pressure of the reactor increased to around 520 psi and vinylidene fluoride was fed on demand to maintain this pressure. After about 2 hours the temperature was raised to 100° C. and held at this temperature for 30 minutes. The pressure was released, the reactor was cooled down, and the polymer was discharged and dried for 4 hours in an air oven at 150° F. The amount of polyvinylidene fluoride incorporated into the graft copolymer was 9.4%.

EXAMPLE 2

This example describes the preparation of a graft copolymer comprising a backbone of propylene homopolymer, to which was grafted polyvinylidene fluoride. No fluorinated solvent was used.

The same polypropylene as used in Example 1 (500 g) was charged to the reactor and an inert atmosphere was established by repeated evacuation and purging with nitrogen at ~15° C. After final evacuation, tert-butyl peroctoate (12 g) and deionized water (50 g) were introduced into the reactor with stirring. After about 10 minutes of stirring, the reactor was evacuated again and vinylidene fluoride was fed into the reactor at 400 psi. The reactor was heated to 114° C. over a period of 30 minutes and maintained at this temperature for one hour. The pressure of the reactor was 880 psi. The reactor was cooled to room temperature (23° C.), the pressure was released, and the reactor was opened. The amount of polyvinylidene fluoride incorporated into the graft copolymer was 3.4 wt. %.

EXAMPLE 3

This example describes the preparation of a graft copolymer comprising a backbone of propylene homopolymer, to which was grafted polyvinylidene fluoride.

Example 1 was repeated except that 2,2-dichloro-1,1,1-trifluoroethane was added 30 minutes after the addition of the di(4-tert-butylcyclohexyl)peroxy dicarbonate suspension, and the reactor was pressurized to 260 psi with vinylidene fluoride. The amount of polyvinylidene fluoride incorporated into the graft copolymer was 10.1 wt. %.

ATR infrared analysis of a plaque molded from the graft copolymer confirmed that the graft-polymerized fluorine-containing monomer is found at the surface of the plaque as well as on the inside.

EXAMPLE 4

This example describes the preparation of a graft copolymer comprising a backbone of propylene homopolymer, to which was grafted polyvinylidene fluoride.

After establishing an inert atmosphere as described in Example 1, a solution of tert-butyl peroxypivalate (6 g in 100 ml of pentane) was added to 550 g of the same polypropylene as used in Example 1 at ~20° C. with stirring, and stirring was continued for 10 minutes. The reactor was heated to 25° C. and pentane was removed by evacuating the reactor. The reactor was heated and 2,2-dichloro-1,1,1-trifluoroethane (200 ml) was introduced at 28° C. At 35° C. the reactor was pressurized with vinylidene fluoride to 240 psi. As the temperature increased to 90° C. over a period of 30 minutes, the pressure increased to 250 psi. The temperature and pressure were maintained for two hours. The temperature of the reactor was then raised to 100° C. When that temperature was reached, the pressure was released and the reactor was cooled to 30° C. The amount of polyvinylidene fluoride incorporated into the graft copolymer was 17.5%.

EXAMPLE 5

This example describes the preparation of a graft copolymer comprising a propylene homopolymer backbone, to which was graft polymerized polyvinylidene fluoride.

The procedure of Example 1 was followed using the propylene homopolymer described in Example 1. The peroxide was introduced at ~19° C. and mixing was continued for 30 minutes. The reactor was subjected to vacuum and 2,2-dichloro-1,1,1-trifluoroethane was introduced. The reactor pressure was 20 psi Vinylidene fluoride was fed into the reactor at 400 psi and the reactor was heated to 85° C. over a period of 30 minutes, during which time the pressure increased to 630 psi. These conditions were maintained for two hours. The temperature was raised to 90° C. and held for 1 hour. The reactor was cooled to 30° C. and depressurized, and the polymer was recovered. The amount of polyvinylidene fluoride incorporated into the graft copolymer was 17.5%.

EXAMPLE 6

This example describes the preparation of a graft copolymer comprising a propylene homopolymer backbone, to which was graft polymerized polyvinylidene fluoride.

The propylene homopolymer described in Example 1 was purged with nitrogen while heating to 70° C. The reactor was evacuated. A suspension of di-(4-tert-butylcyclohexyl) peroxy dicarbonate in 100 g of deionized water was introduced and mixed for two minutes. The reactor was evacuated again while maintaining a temperature of 70° C. 2,2-Dichloro-1,1,1-trifluoroethane (200 ml) was introduced into the reactor while pressurizing with vinylidene fluoride at 480 psi. The temperature dropped to ~53° C., after which the temperature was raised to 85° C. and maintained for two hours. During this time period the pressure increased to 550 psi. The pressure was released and the reactor was heated to 90° C. and held at this temperature for one hour. The reactor was then cooled to 30° C. and the polymer was recovered. The amount of polyvinylidene fluoride incorporated into the graft copolymer was 15.7%.

EXAMPLE 7

This example describes the preparation of a graft copolymer comprising a backbone of propylene homopolymer to which was graft polymerized polyvinylidene fluoride. The starting material was peroxidized propylene homopolymer.

The peroxidized propylene homopolymer was prepared by irradiating propylene homopolymer flake having a MFR of 0.4 dg/min, a pore volume fraction of 0.02 and a surface area of 0.03 $m^2$/g, commercially available from Montell USA Inc., in an inert atmosphere under an electron beam at a dose of 0.5 Mrad. The irradiated polymer was treated with 2.2% by volume oxygen at 80° C. for 90 minutes and then at 140° C. for 60 minutes. After the oxygen treatment, the polymer was treated at 140° C. for one hour in a nitrogen atmosphere and then cooled. The product had a peroxide concentration of 67 mmol/kg of polymer and a MFR of 890.

The peroxidized propylene homopolymer (800 g) was charged to the reactor and purged with nitrogen while heating. At 85° C., 2,2-dichloro-1,1,1-trifluoroethane (300 ml) was added and the reactor was pressurized with vinylidene fluoride to 450 psi. The temperature of the reactor was raised to 120° C. and maintained for two hours. The reactor pressure at this temperature was 620 psi. The pressure was released and the reactor was cooled by cold oil circulation through the jacket while simultaneously purging with nitrogen. The amount of polyvinylidene fluoride incorporated into the graft copolymer was 20 wt %.

EXAMPLE 8

This example describes the preparation of a graft copolymer comprising a backbone of propylene homopolymer, to which was graft polymerized vinylidene fluoride and methyl methacrylate (MMA). Peroxidized propylene homopolymer was used as the starting material.

The peroxidized propylene homopolymer (800 g) described in Example 7 was charged to the reactor and purged with nitrogen at room temperature for 30 minutes, followed by purging while heating to 90° C. MMA (70 g) was charged to the reactor and the mixture was stirred for five minutes. 2,2-Dichloro-1,1,1-trifluoroethane (300 ml) was added to the reactor, followed by pressurizing with vinylidene fluoride to 220 psi The temperature of the reactor was raised to 115°–120° C. and this temperature was maintained for three hours. Vinylidene fluoride was fed on demand to maintain the reactor pressure at 260 psi. The pressure was released and the reactor was cooled to 30° C. The amount of polyvinylidene fluoride incorporated into the graft copolymer was 9.5% and the amount of poly(methyl methacrylate) incorporated was 4.7%.

EXAMPLE 9

This example describes the preparation of a graft copolymer comprising a backbone of propylene homopolymer, to which was graft polymerized vinylidene fluoride and MMA.

Di-(4-tert-butylcyclohexyl)peroxy dicarbonate (10 g as a 40% dispersion in water) diluted with 100 ml of deionized water was added to 500 g of the propylene homopolymer described in Example 1 under inert conditions and mixed well at room temperature. 2,2-Dichloro-1,1,1-trifluoroethane (300 ml) and 90 g of MMA were introduced into the reactor. Vinylidene fluoride was fed at 320 psi. The temperature of the reactor was raised to 90° C. over a period of about 30 minutes and this temperature was maintained for four hours. The pressure of the reactor increased to 560 psi. The pressure was released and the reactor was cooled to 30° C. The polymer product contained 12 wt. % poly(methyl methacrylate) and 3.6% polyvinylidene fluoride.

EXAMPLE 10

This example describes the preparation of a graft copolymer comprising a propylene homopolymer backbone, to which was graft polymerized 2,2,3,4,4,4-hexafluorobutyl methacrylate.

The propylene described in Example 1 (400 g) was heated to 110° C. under inert conditions. Tertiary-butyl peroctoate (3.5 g, 50% solution in odorless mineral spirits) was diluted with 50 g odorless mineral spirits and added to the reactor at the rate of 1 g/min. 2,2,3,4,4,4-Hexafluorobutyl methacrylate (100 g) was diluted with 50 g odorless mineral spirits and added continuously as a separate stream with the peroxide at a rate of 2.24 g/min. The polymerization was carried out at 110°–115° C. for two hours. The reactor was then heated to 125° C. and subjected to vacuum to remove any unreacted monomer and odorless mineral spirits. The amount of polymerized monomer incorporated into the graft copolymer was 20 wt. %.

EXAMPLE 11

This example illustrates the thermal oxidative stability of graft copolymers comprising a propylene homopolymer backbone, to which was grafted polyvinylidene fluoride (PVF2) or poly(vinylidene fluoride/methyl methacrylate) (PMMA/PVF2) produced under the polymerization conditions shown in Table 1.

In each case the initiator was peroxidized propylene homopolymer (peroxidized PP), produced as described in Example 7. The solvent, when present, was 2,2,dichloro-1,1,1-trifluoroethane. In Table 1, VF2 is vinylidene fluoride and MMA is methyl methacrylate. For the case where the grafting monomers were VF2/MMA, the vinylidene fluoride was fed on demand to maintain the pressure, and the monomers were polymerized simultaneously. The starting materials for MMA/VF2(A) and MMA/VF2(B) were the same, except that a fluorinated solvent was used to prepare MMA/VF2(B) but not MMA/VF2(A).

TABLE 1

| Monomer | Initiator | Polymerization Temp. (° C.) | Solvent | Polymerization Time (hours) | Pressure (psi) | Amount of polymerized monomer (wt. %) |
| --- | --- | --- | --- | --- | --- | --- |
| MMA/VF2 (A) | Peroxidized PP | 115 | No | 5 | 380 | 9.5% $PVF_2$ 4.7% PMMA |
| MMA/VF2 (B) | Peroxidized PP | 115 | Yes | 3 | 260 | 9.5% $PVF_2$ 4.7% PMMA |

TABLE 1-continued

| Monomer | Initiator | Polymerization Temp. (° C.) | Solvent | Polymerization Time (hours) | Pressure (psi) | Amount of polymerized monomer (wt. %) |
|---|---|---|---|---|---|---|
| VF2 | Peroxidized PP | 120 | Yes | 2 | 400 | 20% |

The thermal oxidative stability of the samples was assessed by thermogravimetric analysis using a Perkin-Elmer TGA-7 analyzer. About 15 mg of sample were scanned at 10°/min in air from 30° C. to 900° C. and the weight loss was monitored. The results are shown in FIG. 1.

The data show that the graft copolymers made with fluorinated monomers were more thermally stable than the propylene homopolymer alone. When a fluorinated solvent is used, the same amount of polymerized fluorinated monomer can be incorporated into the graft copolymer using a lower pressure and a shorter reaction time than when the solvent is not present.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A fluorine-containing graft copolymer comprising a backbone of an olefin polymer material to which is graft polymerized (a) at least one fluorinated gaseous monomer having the formula $CR_1R_2=CR_3R_4$, where $R_1$=H, F, or Cl; $R_2$=H, F, or Cl; $R_3$=H, F, $CH_3$, $CF_3$, or Cl, and $R_4$=H, F, or Cl, wherein at least two fluorine atoms are present, and, optionally, (b) at least one non-fluorinated monomer selected from the group consisting of (i) vinyl-substituted aromatic, heterocyclic, and alicyclic compounds, (ii) unsaturated aliphatic nitriles, and (iii) unsaturated aliphatic monocarboxylic acids or esters thereof, wherein the total amount of monomers added is about 1 to about 100 parts per hundred parts of the olefin polymer material, and wherein the particulate olefin polymer material has a weight average diameter of about 0.4–7 mm, a surface area of at least 0.1 $m^2/g$, and a pore volume fraction of at least about 0.07 and wherein more than 40% of the pores in the particle have a diameter greater than 1 micron.

2. The graft copolymer of claim 1 wherein the olefin polymer material is selected from the group consisting of:
   (1) a homopolymer of a linear or branched $C_{2-8}$ alpha-olefin;
   (2) a random copolymer of a linear or branched $C_{2-8}$ alpha-olefin with a different olefin selected from the group consisting of $C_{2-10}$ alpha-olefins, provided that, when the different olefin is ethylene, the maximum polymerized ethylene content is about 10% by weight; when the olefin is propylene and the different olefin is a $C_{4-10}$ alpha-olefin, the maximum polymerized content thereof is 20% by weight, and when the olefin is ethylene and the different olefin is a $C_{3-10}$ alpha-olefin, the maximum polymerized content thereof is 10% by weight;
   (3) a random terpolymer of a linear or branched $C_{3-8}$ alpha-olefin and two different olefins selected from the group consisting of ethylene and $C_{4-8}$ alpha-olefins, provided that the maximum polymerized content of the different $C_{4-8}$ alpha-olefins is 20% by weight, and when ethylene is one of the different olefins, the maximum polymerized ethylene content is 5% by weight, and
   (4) linear low density polyethylene comprising a copolymer of ethylene and about 0.5% to about 35% of at least one $C_3$–$C_{12}$ alpha-olefin having a density of about 0.88 to about 0.935 $g/cm^3$.

3. The graft copolymer of claim 1 wherein the gaseous monomer is vinylidene fluoride.

4. The graft copolymer of claim 1 wherein the non-fluorinated monomer is methyl methacrylate.

5. A process for preparing a fluorine-containing graft copolymer comprising, in a non-oxidizing environment:
   (1) treating a particulate olefin polymer material at a temperature of about 10° to about 70° C. with about 0.1 to about 6.0 parts per hundred parts of the olefin polymer material, of an organic compound that is a chemical free radical polymerization initiator and has a decomposition half-life at the temperature used in step (2) of about 1 to about 240 minutes,
   (2) increasing the temperature to about 60° to about 115° C.,
   (3) adding (a) at least one fluorinated gaseous monomer having the formula $CR_1R_2=CR_3R_4$, where $R_1$=H, F, or Cl; $R_2$=H, F, or Cl; $R_3$=H, F, $CH_3$, $CF_3$, or Cl, and $R_4$=H, F, or Cl, wherein at least two fluorine atoms are present, and, optionally, (b) at least one non-fluorinated monomer selected from the group consisting of (i) vinyl-substituted aromatic, heterocyclic, and alicyclic compounds, (ii) unsaturated aliphatic nitriles, and (iii) unsaturated aliphatic monocarboxylic acids or esters thereof, wherein the total amount of monomers added is about 1 to about 100 parts per hundred parts of the olefin polymer material, to produce and maintain a pressure of about 200 to about 900 psi,
   (4) heating at a temperature within the range specified in step (2) for about 1 to about 6 hours,
   (5) cooling to room temperature, and
   (6) releasing the pressure to remove unreacted monomer, wherein the particulate olefin polymer material has a weight average diameter of about 0.4–7 mm, a surface area of at least 0.1 $m^2/g$, and a pore volume fraction of at least about 0.07 and wherein more than 40% of the pores in the particle have a diameter greater than 1 micron.

6. The process of claim 5 wherein the particulate olefin polymer material is selected from the group consisting of:
   (1) a homopolymer of a linear or branched $C_{2-8}$ alpha-olefin;
   (2) a random copolymer of a linear or branched $C_{2-8}$ alpha-olefin with a different olefin selected from the group consisting of $C_{2-10}$ alpha-olefins, provided that, when the different olefin is ethylene, the maximum polymerized ethylene content is about 10% by weight; when the olefin is propylene and the different olefin is a $C_{4-10}$ alpha-olefin, the maximum polymerized content thereof is about 20% by weight, and when the olefin is ethylene and the different olefin is a $C_{3-10}$ alpha-olefin, the maximum polymerized content thereof is about 10% by weight; and (3) a random terpolymer of a linear or branched $C_{3-8}$ alpha-olefin and two different olefins selected from the group consisting of ethylene and $C_{4-8}$ alpha-olefins, provided that the maximum polymerized content of the different $C_{4-8}$ alpha-olefins is 20% by weight, and when ethylene is one of the different olefins, the maximum polymerized ethylene content is 5% by weight.

7. The process of claim 5 wherein the gaseous monomer is vinylidene fluoride.

8. The process of claim 5 wherein the non-fluorinated monomer is methyl methacrylate.

9. The process of claim 5 wherein a fluorinated solvent is added in step (3).

10. A fluorine-containing graft copolymer comprising a backbone of an olefin polymer material to which is graft polymerized a combination of:
   (a) at least one fluorinated gaseous monomer having the formula $CR_1R_2=CR_3R_4$, where $R_1$=H, F, or Cl; $R_2$=H, F, or Cl; $R_3$=H, F, $CH_3$, $CF_3$, or Cl, and $R_4$=H, F, or Cl, wherein at least two fluorine atoms are present,
   (b) at least one fluorinated monomer having the formula $CH_2=C(R_1)-(COOR_2)$, where $R_1$=H, $CH_3$, or $CF_3$, and $R_2$ is H or a partially or completely fluorinated $C_1-C_{12}$ alkyl group, and, optionally,
   (c) at least one non-fluorinated monomer selected from the group consisting of (i) vinyl-substituted aromatic, heterocyclic, and alicyclic compounds, (ii) unsaturated aliphatic nitriles, and (iii) unsaturated aliphatic monocarboxylic acids or esters thereof,
wherein the total amount of polymerized monomers added is about 1 to about 100 parts per hundred parts of the olefin polymer material.

11. The graft copolymer of claim 10 wherein the olefin polymer material is selected from the group consisting of:
   (1) a homopolymer of propylene having an isotactic index greater than 80;
   (2) a copolymer of propylene and an olefin selected from the group consisting of ethylene and 4–10 C alpha-olefins, provided that when the olefin is ethylene, the maximum polymerized ethylene content is 10% and when the olefin is a 4–10 C alpha-olefin, the maximum polymerized content thereof is 20% by weight, the copolymer having an isotactic index greater than 85;
   (3) a terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;
   (4) an olefin polymer composition comprising:
      (a) about 10% to about 60% by weight of a propylene homopolymer having an isotactic index greater than 80 or a copolymer of monomers selected from the group consisting of (i) propylene and ethylene, (ii) propylene, ethylene and a 4–8 C alpha-olefin, and (iii) propylene and a 4–8 C alpha-olefin, the copolymer having a polymerized propylene content of more than 85% by weight and an isotactic index greater than 85;
      (b) about 5% to about 25% by weight of a copolymer of ethylene and propylene or a 4–8 C alpha-olefin that is insoluble in xylene at ambient temperature; and
      (c) about 30% to about 70% by weight of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity, measured in decahydronaphthalene at 135° C., of about 1.5 to about 4.0 dl/g,
   wherein the total amount of (b) and (c), based on the total olefin polymer composition, is about 50% to about 90%, the weight ratio of (b)/(c) is less than 0.4, and the composition is prepared by polymerization in at least two stages and has a flexural modulus of less than 150 MPa; and
   (5) a thermoplastic olefin comprising:
      (a) about 10% to about 60% of a propylene homopolymer having an isotactic index greater than 80, or a copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;
      (b) about 20% to about 60% of an amorphous copolymer from monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and
      (c) about 3% to about 40% of a copolymer of ethylene and propylene or a 4–8 C alpha-olefin that is insoluble in xylene at ambient temperature,
   wherein the thermoplastic olefin has a flexural modulus of greater than 150 but less than 1200 MP.

12. A process for preparing a fluorine-containing graft copolymer comprising, in a non-oxidizing environment:
   (1) treating a particulate olefin polymer material at a temperature of about 10° to about 70° C. with about 0.1 to about 6.0 parts per hundred parts of the olefin polymer material, of an organic compound that is a chemical free radical polymerization initiator and has a decomposition half-life at the temperature used in step (2) of about 1 to about 240 minutes,
   (2) increasing the temperature to about 60° to about 115° C.,
   (3) adding a combination of:
      (a) at least one fluorinated gaseous monomer having the formula $R_1R_2=CR_3R_4$, where $R_1$=H, F, or Cl; $R_2$=H, F, or Cl; $R_3$=H, F, $CH_3$, $CF_3$, or Cl, and $R_4$=H, F, or Cl, wherein at least two fluorine atoms are present, to produce and maintain a pressure of about 200 to about 900 psi,
      (b) at least one fluorinated monomer having the formula $CH_2=C(R_1)-(COOR_2)$, where $R_1$=H, $CH_3$, or $CF_3$, and $R_2$ is H or a partially or completely fluorinated $C_1-C_{12}$ alkyl group, and, optionally,
      (c) at least one non-fluorinated monomer selected from the group consisting of (i) vinyl-substituted aromatic, heterocyclic, and alicyclic compounds, (ii)

unsaturated aliphatic nitrites, and (iii) unsaturated aliphatic monocarboxylic acids or esters thereof, wherein the total amount of monomers added is about 1 to about 100 parts per hundred parts of the olefin polymer material, (4) heating at a temperature within the range specified in step (2) for about 1 hour to about 6 hours, (5) cooling to room temperature, and (6) releasing the pressure to remove unreacted monomer.

13. The process of claim 12 wherein the olefin polymer material is selected from the group consisting of:

(1) a homopolymer of propylene having an isotactic index greater than 80;

(2) a copolymer of propylene and an olefin selected from the group consisting of ethylene and 4–10 C alpha-olefins, provided that when the olefin is ethylene, the maximum polymerized ethylene content is 10% and when the olefin is a 4–10 C alpha-olefin, the maximum polymerized content thereof is 20% by weight, the copolymer having an isotactic index greater than 85;

(3) a terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;

(4) an olefin polymer composition comprising:

(a) about 10% to about 60% by weight of a propylene homopolymer having an isotactic index greater than 80 or a copolymer of monomers selected from the group consisting of (i) propylene and ethylene, (ii) propylene, ethylene and a 4–8 C alpha-olefin, and (iii) propylene and a 4–8 C alpha-olefin, the copolymer having a polymerized propylene content of more than 85% by weight and an isotactic index greater than 85;

(b) about 5% to about 25% by weight of a copolymer of ethylene and propylene or a 4–8 C alpha-olefin that is insoluble in xylene at ambient temperature; and (c) about 30% to about 70% by weight of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity, measured in decahydronaphthalene at 135° C., of about 1.5 to about 4.0 dl/g, wherein the total amount of (b) and (c), based on the total olefin polymer composition, is about 50% to about 90%, the weight ratio of (b)/(c) is less than 0.4, and the composition is prepared by polymerization in at least two stages and has a flexural modulus of less than 150 MPa; and (5) a thermoplastic olefin comprising:

(a) about 10% to about 60% of a propylene homopolymer having an isotactic index greater than 80, or a copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;

(b) about 20% to about 60% of an amorphous copolymer from monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and (c) about 3% to about 40% of a copolymer of ethylene and propylene or a 4–8 C alpha-olefin that is insoluble in xylene at ambient temperature, wherein the thermoplastic olefin has a flexural modulus of greater than 150 but less than 1200 MP.

* * * * *